(12) United States Patent
Kawai et al.

(10) Patent No.: US 7,926,625 B2
(45) Date of Patent: Apr. 19, 2011

(54) DISK BRAKING DEVICE AND MOTORCYCLE PROVIDED WITH THE DISK BRAKING DEVICE

(75) Inventors: Hideo Kawai, Shizuoka (JP); Manabu Abe, Shizuoka (JP); Itsurou Migita, Shizuoka (JP); Kazuaki Ura, Shizuoka (JP); Masatoshi Kurita, Shizuoka (JP); Fujio Ikki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1087 days.

(21) Appl. No.: 11/468,214

(22) Filed: Aug. 29, 2006

(65) Prior Publication Data

US 2007/0045056 A1 Mar. 1, 2007

(30) Foreign Application Priority Data

Aug. 30, 2005 (JP) .................... 2005-249312

(51) Int. Cl.
*F16D 55/228* (2006.01)
(52) U.S. Cl. .................. 188/72.5; 188/26; 188/18 A
(58) Field of Classification Search ............ 188/18 A, 188/218 XL, 26, 72.1, 72.4, 72.5, 73.2
See application file for complete search history.

(56) References Cited

U.S. PATENT DOCUMENTS

| | | | | |
|---|---|---|---|---|
| 5,363,943 A | * | 11/1994 | Iwashita et al. | 188/72.5 |
| 5,477,944 A | * | 12/1995 | Bryan et al. | 188/72.5 |
| 5,620,063 A | * | 4/1997 | Smith | 188/73.2 |
| 6,651,785 B2 | * | 11/2003 | Cornolti et al. | 188/73.1 |

FOREIGN PATENT DOCUMENTS

| | | |
|---|---|---|
| DE | 102 12 670 | 12/2002 |
| EP | 0 710 777 | 5/1996 |
| EP | 1 113 184 | 7/2001 |
| JP | 05-116668 | 5/1993 |
| WO | 94/07049 | 3/1994 |
| WO | 03/071152 | 8/2003 |

OTHER PUBLICATIONS

English machine translation of DE 10212670.*

* cited by examiner

*Primary Examiner* — Robert A Siconolfi
*Assistant Examiner* — Vu Q Nguyen
(74) *Attorney, Agent, or Firm* — Keating & Bennett, LLP

(57) ABSTRACT

A disk braking device suppresses warp of friction members and deterioration in reaction at the time of braking, and provides friction members with a uniform service life, where pistons are increased in number to heighten a braking force. A piston mechanism comprises pistons arranged along an outer periphery of a disk plate. The pistons are allotted to a plurality of piston portions that have different cylinder areas s1 and (s2+s3). A pad unit is divided into a plurality of pad unit portions that have different total pressure contact areas p1 and (p2+p3) corresponding to the cylinder areas s1 and (s2+s3).

12 Claims, 9 Drawing Sheets

DISK BRAKING DEVICE AND MOTORCYCLE PROVIDED WITH THE DISK BRAKING DEVICE

RELATED APPLICATIONS

This application claims the benefit of priority under 35 USC 119 of Japanese patent application No. 2005-249312, filed on Aug. 30, 2005, which application is hereby incorporated by reference in its entirety.

BACKGROUND OF THE INVENTION

1. Field of the Invention

The present invention relates to a disk braking device in which a disk plate fixed to a wheel is interposed by friction members, and a motorcycle provided with the disk braking device.

2. Description of Related Art

In a conventional disk braking device for motorcycles, the number of pistons may be increased to increase braking effective diameter and braking force. Also, to make the piston pushing force uniform, the pistons at an entering side of a disk plate may be smaller in cylinder area than a leaving side (see, for example, JP-A-5-116668).

When the number of pistons is increased, a pad unit must also be lengthened in circumferential dimension corresponding to the increase in number of pistons. Consequently, the friction members of the pad unit may warp due to frictional heat or the like and become nonuniform in bearing against a disk plate, causing a deterioration in reaction at the time of braking.

In order to suppress warp of the friction members and dispersion in bearing, the pad unit may be divided into a number of sections corresponding to the number of pistons. However, division of the pad unit causes a problem that the caliper must be larger and the service life of the friction members becomes non-uniform.

SUMMARY OF THE INVENTION

The invention overcomes these drawbacks and provides a disk braking device that suppresses warp of friction members and deterioration in reaction at the time of braking, and provides a uniform friction member service life where pistons are increased in number to heighten a braking force.

Accordingly, one embodiment of the invention is a disk braking device comprising a disk plate fixed to a wheel. A pad unit generates a frictional force between it and the disk plate. A piston mechanism brings the pad unit into pressure contact with the disk plate. A caliper body holds the piston mechanism. The piston mechanism comprises a plurality of piston portions arranged along an outer periphery of the disk plate. Each piston portion has a different total cylinder area. The pad unit comprises a plurality of pad unit portions. Each pad unit portion comprises a base plate, against which the piston abuts, and a friction member fixed to the base plate to abut against the disk plate. Each pad unit portion has a friction member area corresponding to a cylinder area of a corresponding piston portion.

In one embodiment of the invention, the piston mechanism comprises a plurality of piston portions having different cylinder areas, and the pad unit comprises a plurality of pad unit portions having friction member areas corresponding to the cylinder areas, so that warp of the friction members and dispersion in bearing is suppressed at the time of pressure contact where the pistons are increased in number to heighten a braking force, thus making reaction favorable at the time of braking.

Also, since the pad unit has a total friction member area corresponding to a total cylinder area, the friction members wear uniformly according to cylinder area and have a substantially uniform service life.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
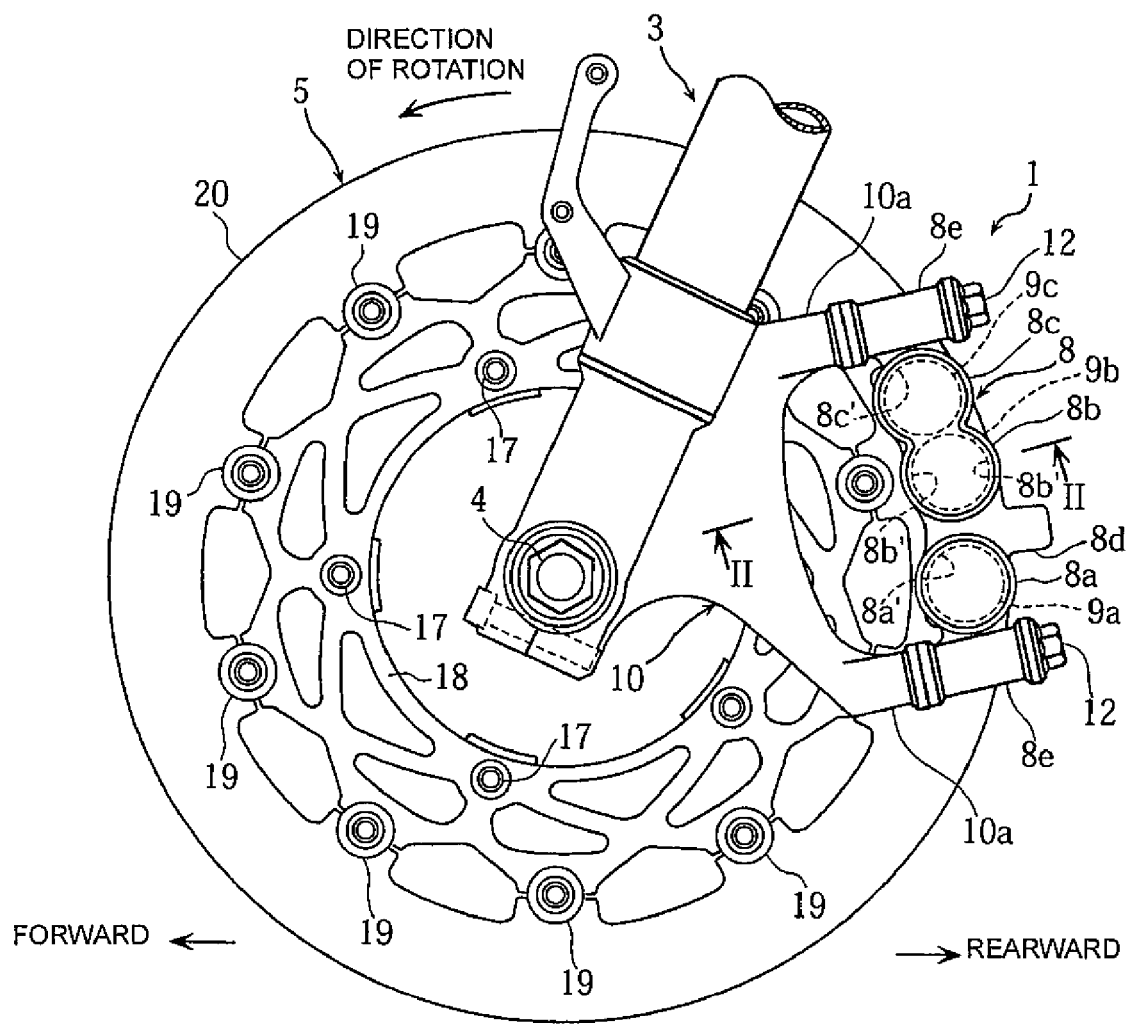
FIG. 1 is a side view of a disk braking device according to a first embodiment of the invention.

Embodiments of the invention are described below with reference to the accompanying drawings.

FIGS. 1-6 illustrate a disk braking device according to a first embodiment of the invention. The illustrated embodiment is a disk braking device for motorcycles.

In the drawings, the reference numeral 1 denotes a front disk braking device arranged on a front wheel 2 of a motorcycle. The front wheel 2 is journaled by a lower end of a front fork 3. The front fork 3 is supported on a head pipe, which is fixed to a front end of a vehicle body frame (not shown), to be steered left and right, and a steering handle (not shown) is mounted to an upper end of the front fork 3.

The front wheel 2 is constructed such that a hub 2a and a rim 2b with a tire (not shown) mounted thereto are connected to each other by means of a plurality of spokes. An axle shaft 4 is inserted into the hub 2a with a bearing (not shown) therebetween and is fixed to the front fork 3.

A rearwardly projecting caliper bracket 10 is formed on a lower end of the front fork 3. A pair of upper and lower mounts 10a, 10a projecting radially and rearwardly are integrally formed with the caliper bracket 10.

The disk braking device 1 comprises a disk plate 5 fixed to the hub 2a of the front wheel 2 to rotate with the front wheel 2, a pad unit 6 that generates a frictional force between it and the disk plate 5, a piston mechanism 7 that brings the pad unit 6 into pressure contact with the disk plate 5, and a caliper body 8 that holds the piston mechanism 7.

Figure 3:
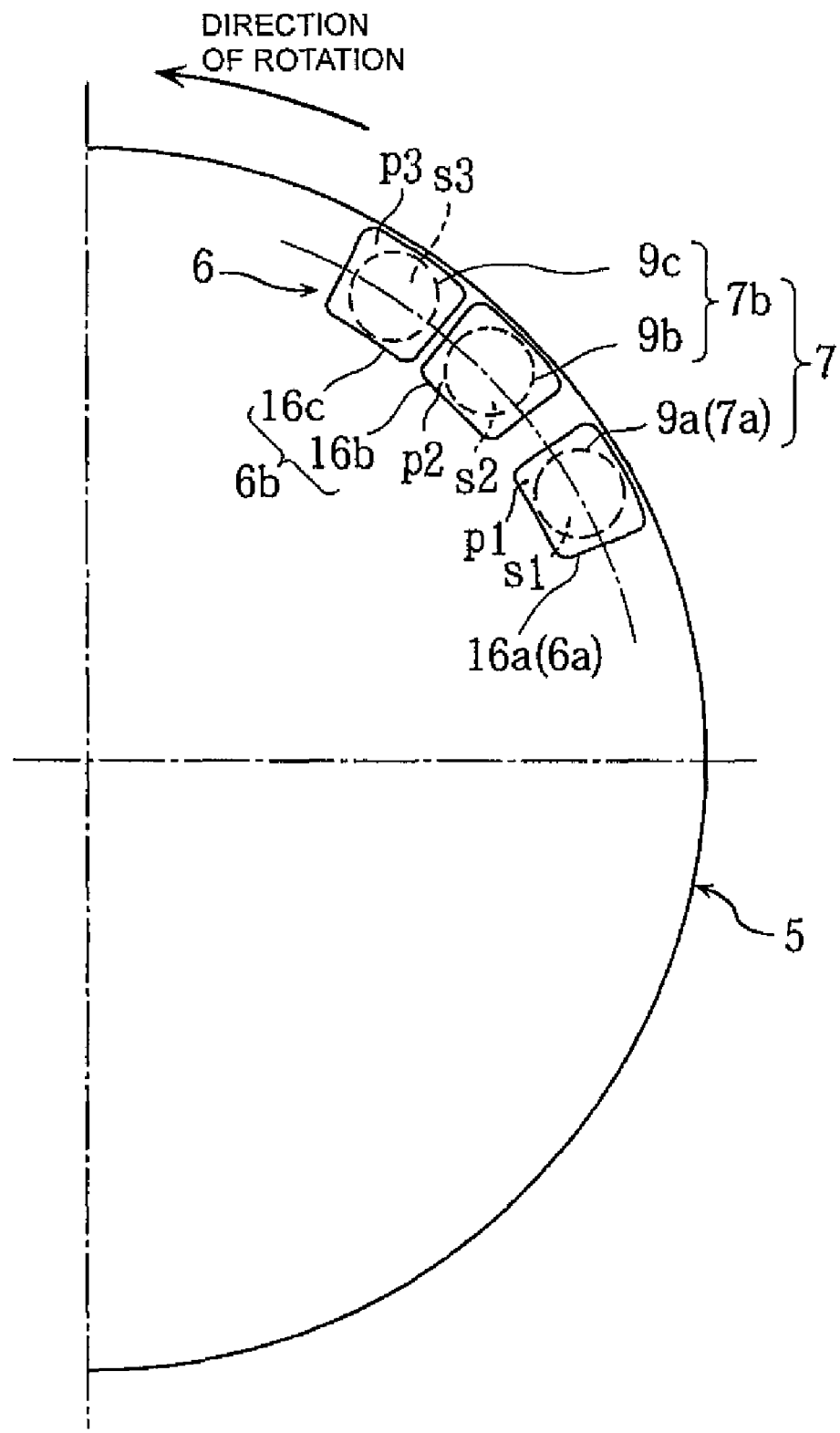
FIG. 3 is a view showing a construction of piston portions and pad units of the disk braking device.
Figure 4:
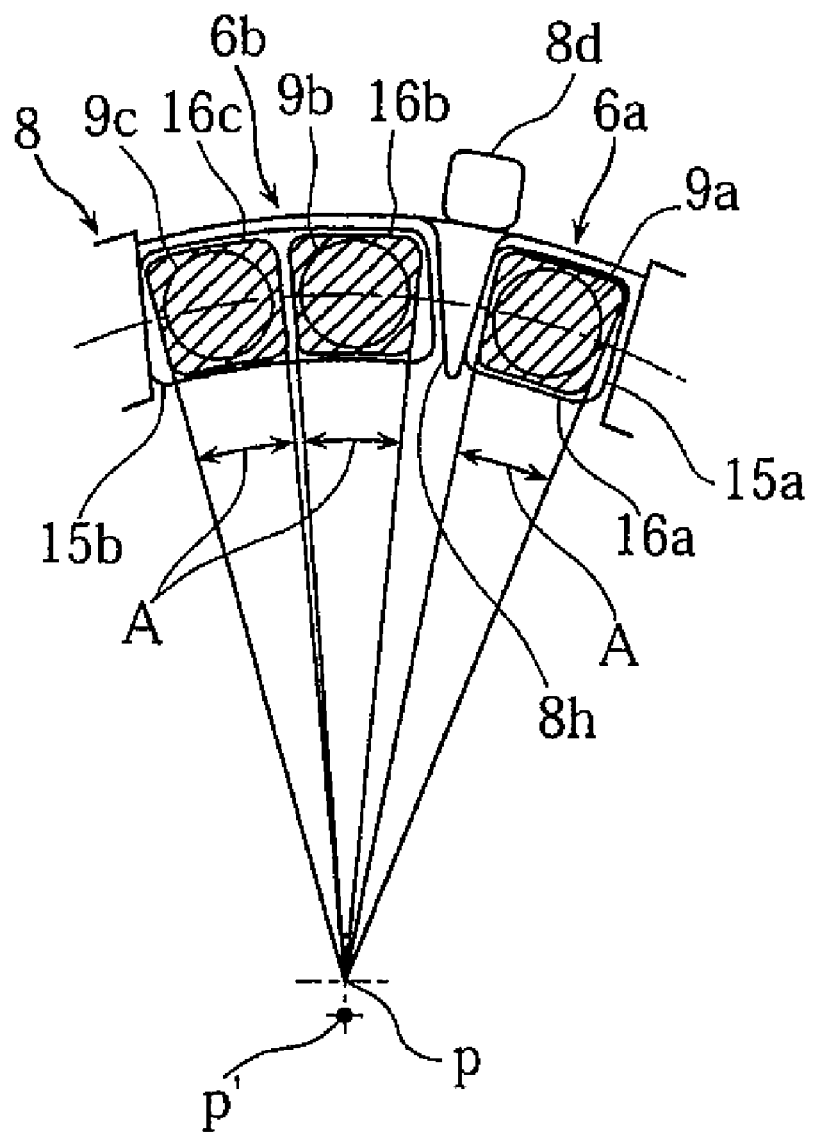
FIG. 4 is a view showing a construction of the pad units.

The disk plate 5 comprises a plate body 18 fixed to an outer side surface of the hub 2a by a plurality of bolts 17, and a brake disk 20 joined to an outer periphery of the plate body 18 by a plurality of rivet type pins 19.

the piston mechanism 7 comprises three pairs of left and right pistons 9a, 9b, 9c arranged in opposition to one another along an outer periphery of the disk plate 5 (FIG. 3). All the respective pistons 9a, 9b, 9c have the same cylinder area s1-s3 and are composed of first left and right piston portions 7a having one piston 9a and second left and right piston portions 7b having two pistons 9b, 9c. Thus, the second piston portions 7b have a total cylinder area (s2+s3) that is twice the cylinder area s1 of the first piston portions 7a.

The first piston portions 7a having a smaller cylinder area are arranged on an entering side of the disk plate 5 (in the direction of rotation of disk plate 5) and the second piston portions 7b are arranged on a leaving side (in the direction of rotation of disk plate 5).

The caliper body 8 comprises first, second, and third left and right piston holding portions 8a, 8b, 8c arranged opposingly with the disk plate 5 therebetween, a bridge 8d arranged in a manner to straddle an outside of the disk plate 5 and to join the first, second, and third left and right piston holding portions 8a-8c together, and radial mount bosses 8e, 8e formed integral with ends of the first and third piston holding portions 8a, 8c (FIG. 1).

Figure 6:
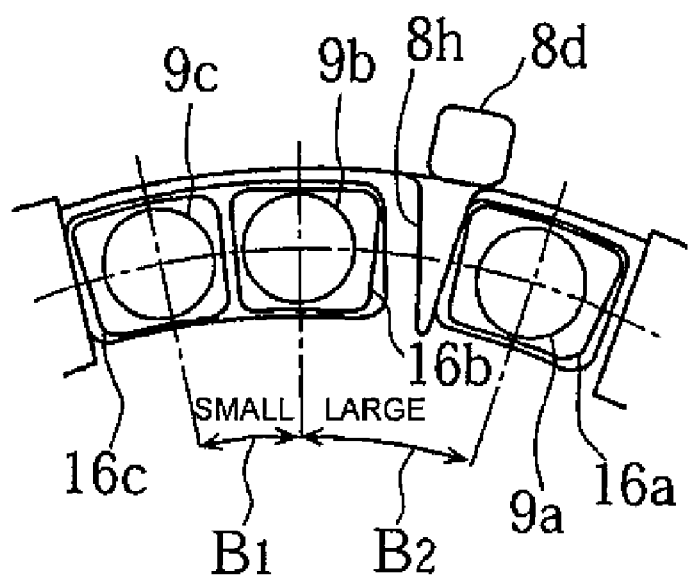
FIG. 6 is a view showing a construction of the pad units.

The bridge 8d is arranged between the first and second piston portions 7a, 7b and in a position a little offset toward the first piston portion 7a. Also, as shown in FIG. 6, a piston interval B1 between pistons 9b and 9c in the second piston portions 7b is smaller than an interval B2 between the pistons 9b in the second piston portions 7b and the pistons 9a in the first piston portions 7a.

The first to third left and right piston holding portions 8a-8c, respectively, are formed with piston holding holes 8a'-8c'. Piston holding holes 8a'-8c' are formed by machining with a cutting tool that is inserted through a work hole 8g formed on a side wall (inner side wall) of the caliper body 8. The pistons 9b, 9b, for example, are inserted into the left and right piston holding holes 8b', 8b' through the work hole 8g, and thereafter the work hole 8g is closed oil-tightly by a plug material 13. Piston holding holes 8a', 8c' are formed in the same manner.

The caliper body 8 in the embodiment has a monoblock structure, in which the first to third left and right piston holding portions 8a to 8c are joined integrally by the bridge 8d. The work hole 8g is formed on the first to third right piston holding portions 8a-8c and the mount bosses 8e are formed on the first to third left piston holding portions 8a-8c in opposition to the work hole 8g. The upper and lower mount bosses 8e, 8e are clamped and fixed to the respective mounts 10a of the caliper bracket 10 by means of bolts 12, 12 threadedly inserted from radially outward.

Figure 2:
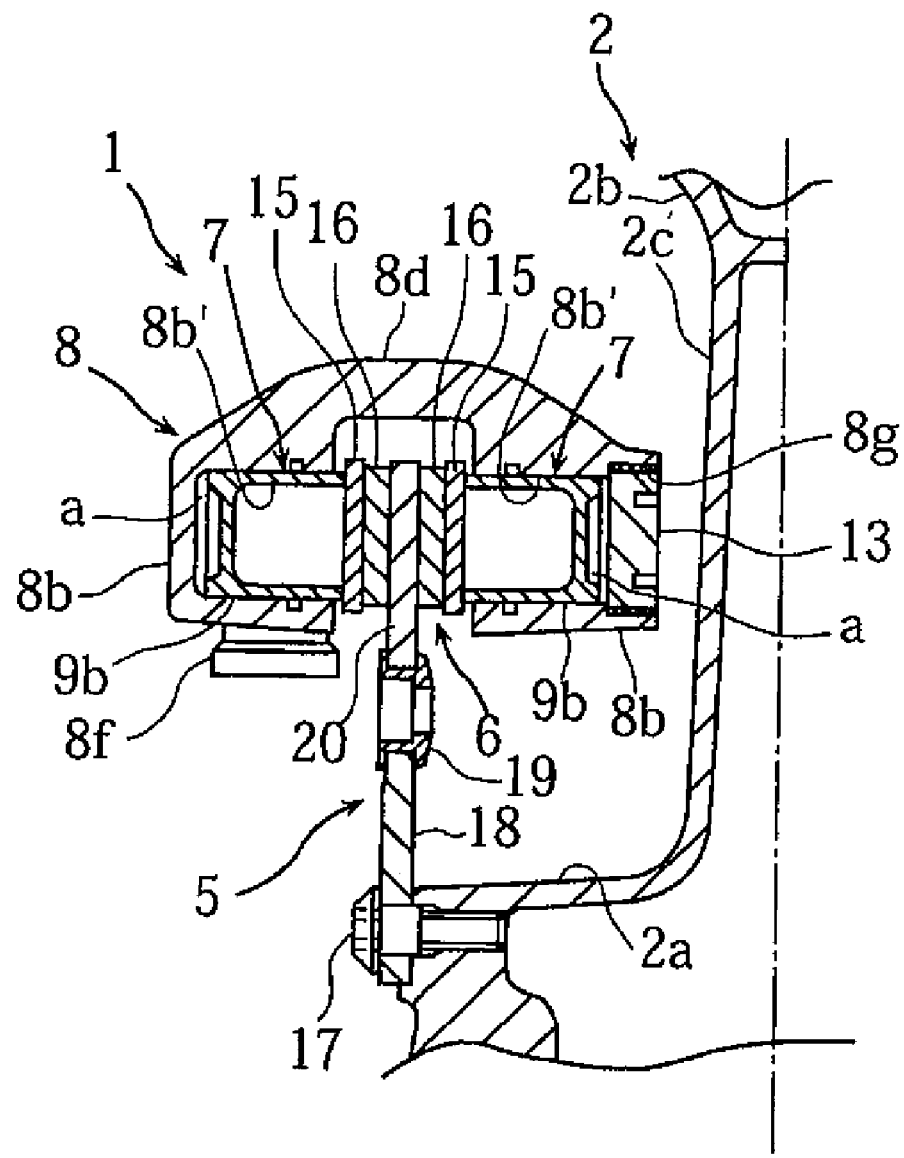
FIG. 2 is a cross sectional view taken through line II-II of FIG. 1 of the disk braking device.

The pistons 9a-9c are inserted into and arranged in the respective holding holes 8a'-8c' of the piston holding portions 8a-8c to be able to advance and retreat. Hydraulic pressure chambers 'a' are defined between pistons 9a-9c and the bottoms of the holding holes 8a'-8c' (FIG. 2).

The caliper body 8 is formed with a hydraulic pressure supply port 8f, through which a working oil is supplied to hydraulic pressure chambers 'a'. A master cylinder is connected to the hydraulic pressure supply port 8f through a brake hose (not shown) and a brake lever is connected to the master cylinder. The master cylinder and the brake lever are arranged on the steering handle described above.

The pad unit 6 comprises base plates 15, against which the respective left and right pistons 9a-9c abut, and friction members 16 fixed to the base plates 15. The friction members 16 are opposed to and abut against brake disk 20.

The pad unit 6 comprises first and second pad unit portions 6a, 6b having total respective friction member areas p1 and (p2+p3) of a ratio corresponding to total cylinder areas s1 and (s2+s3) of the first and second left and right piston portions 7a, 7b. More specifically, friction members 16a fixed to first base plates 15a of the first pad unit portion 6a have a friction member area p1 corresponding to a cylinder area s1 of the first piston portions 7a. Also, friction members 16b, 16c fixed to second base plates 15b of the second pad unit 6b have a total friction member area (p2+p3) corresponding to a total cylinder area (s2+s3) of the second piston portions 7b, that is, a total friction member area twice that of the friction members 16a. In addition, friction member areas p1-p3 are a little larger than cylinder areas s1-s3.

The left and right friction members 16a-16c are radial about a point 'p' positioned close to a center 'p'' of rotation of the disk plate 5 and are all the same in shape. In this manner, each of friction members 16a-16c is in the form of a trapezoid that is increased in dimension A in a direction of rotation as it goes outward from a center (see FIG. 4). In addition, the radially central point p may agree with the center p' of rotation of the disk plate 5.

A torque bearer 8h is formed between pad unit portions 6a, 6b of the caliper body 8. The torque bearer 8h bears torque exerted by the first pad unit portions 6a. That is, downstream edges of the first base plates 15a abut against torque bearer 8h in a direction in which the disk plate 5 enters (in a direction of rotation). The bridge 8d is positioned on a side of the torque bearer 8h toward the first pad unit portions 6a and is formed integral with the torque bearer 8h.

When the brake lever is operated, the master cylinder generates a hydraulic pressure that is supplied to the hydraulic pressure chambers 'a' through the hydraulic pressure supply port 8f. This causes pistons 9a-9c to advance to bring the friction members 16a-16c into pressure contact with the disk plate 5 to interpose the disk plate 5 therebetween. The frictional force that is generated brakes the front wheel 2.

Since pistons 9a-9c, whose cylinder areas s1-s3 are the same, are composed of the first piston portions 7a and the second piston portions 7b, that have different respective cylinder areas s1 and (s2+s3), and the pad unit 6 is composed of the first and second pad unit portions 6a, 6b, that have different respective friction member areas p1 and (p2+p3), which correspond to cylinder areas s1 and (s2+s3), it is possible to suppress warp of the friction members 16a-16c and dispersion in bearing at the time of pressure contact in the case where the pistons are increased in number to heighten a braking force, thus enabling making reaction favorable at the time of braking.

Also, since the pad unit 6 is composed of the first and second pad unit portions 6a, 6b having respective friction member areas p1 and (p2+p3), which correspond to cylinder areas s1 and (s2+s3), the friction members 16a-16c wear uniformly according to cylinder area, thereby making service life substantially uniform.

Since the friction members 16a-16c are the same in number and in shape as the corresponding pistons 9a-9c, they can be formed with one die for paid unit molding, thereby improving productivity.

Also, since friction members 16a-16c are formed radially about point p positioned close to the center p' of the disk plate 5, the outer peripheral portion of the disk plate 5, which is high in rotational frequency, can be made large in frictional area, thereby suppressing local abrasion of the friction members 16a-16c.

Since the first piston portions 7a having a small cylinder area s1 are positioned on an entering side of the disk plate 5, the braking force exerted by the first piston portions 7a is relatively small, decreasing the strength demanded of the torque bearer 8h and thereby enabling a decrease in size and weight of the caliper body 8.

Also, since the torque bearer 8h is arranged between the first and second pad unit portions 6a, 6b to bear torque exerted by the first pad unit portions 6a, it is possible to decrease the strength demanded of the torque bearer 8h, so that caliper body 8 can be smaller and lighter.

Since the bridge 8d that joins the left and right piston holding portions 8a-8c to make them integral is arranged between the first and second pad unit portions 6a, 6b and positioned a little offset toward the first pad unit portion 6a, the caliper body 8 toward the first pad unit portion 6a can be increased in stiffness, so that it is possible to further heighten responsibility of the pad unit portion 6a at the time of braking.

Since piston interval B1 in the second piston portions 7b is smaller than interval B2 between the pistons 9a, 9b with the torque bearer 8h therebetween, it is possible to inhibit the caliper body 8 on the side of the second piston portions 7b, on which the bridge is not present, from being decreased in stiffness, to heighten responsibility at the time of braking, and to suppress brake noise.

Figure 5:
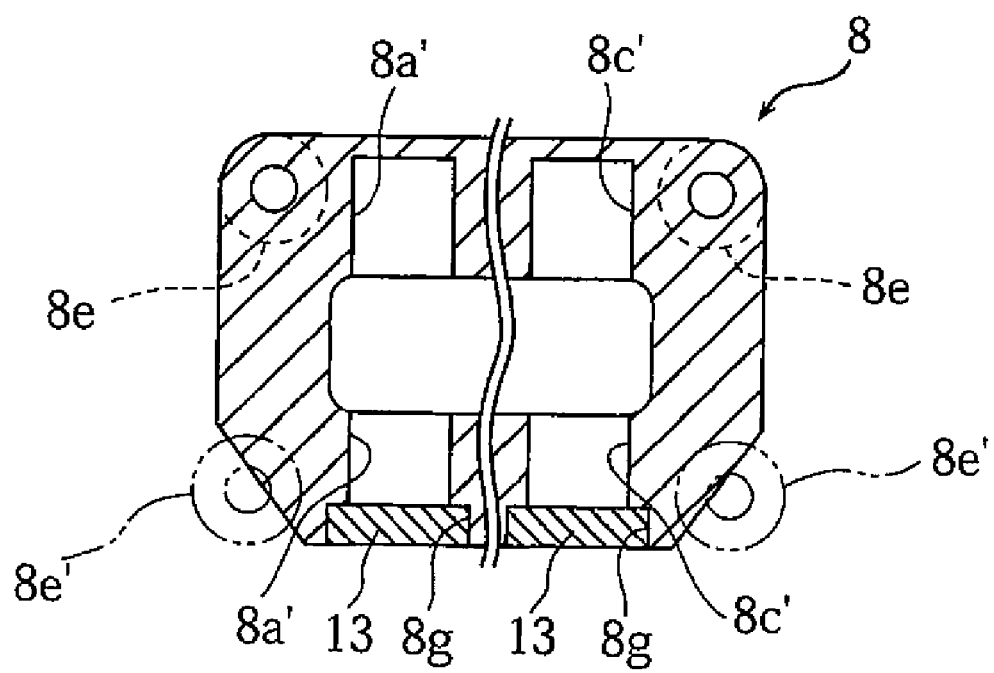
FIG. 5 is a plan view of a caliper body of the disk braking device.

Since the work hole 8g is formed on one of the left and right piston holding portions 8a-8c and the bosses 8e are formed on the other thereof, it is possible to decrease the size of caliper body 8. More specifically, as shown in FIG. 5, when mounted bosses 8e' (see two-dot chain line) are formed on a side of the piston holding portions 8a-8c toward the work hole 8g, there is a problem in that the whole caliper body 8 must be larger to ensure a predetermined dimension between the work hole 8g, which is larger in diameter than the piston holes, and the bosses 8e.

While this embodiment has been described with respect to a case where three pistons 9a-9c have cylinder areas s1-s3 that are the same, and are allotted to the first and second piston portions 7a, 7b, the invention is not limited thereto.

Figure 7:
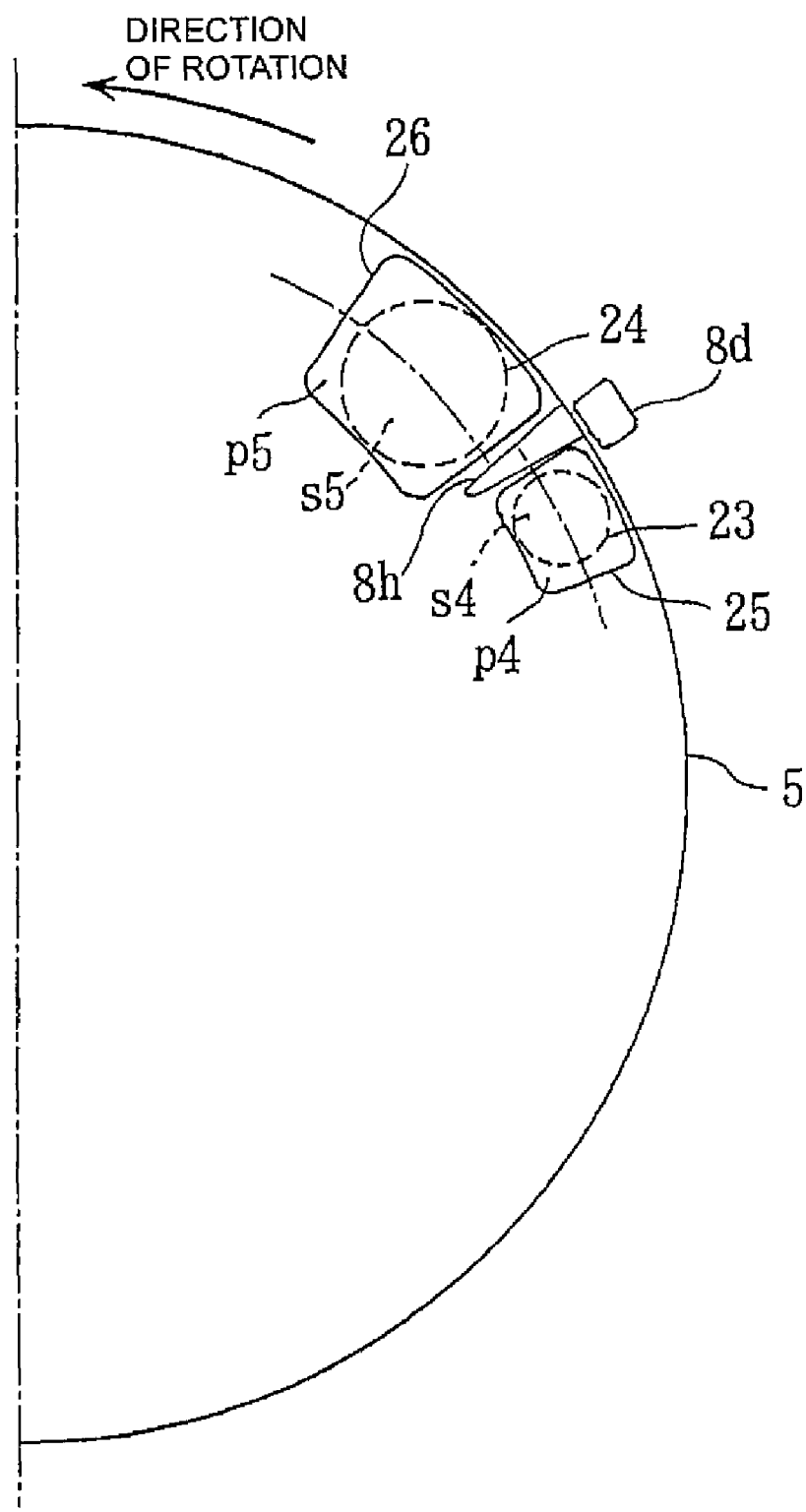
FIG. 7 is a view showing a construction of piston portions and pad units according to a second embodiment of the invention.

FIG. 7 illustrates a piston mechanism according to a second embodiment of the invention. The piston mechanism of the second embodiment comprises a small diameter piston 23 and a large diameter piston 24, whose respective cylinder areas s4 and s5 are small and large. A pad unit comprises a small pad unit 25 and a large pad unit 26, which have respective friction member areas p4 and p5 corresponding to the cylinder areas s4 and s5 of the small diameter piston 23 and large diameter piston 24.

According to the second embodiment, warp of the friction members and dispersion in bearing is suppressed to make reaction favorable at the time of braking, thus producing the same effect as in the first embodiment.

Figure 8:
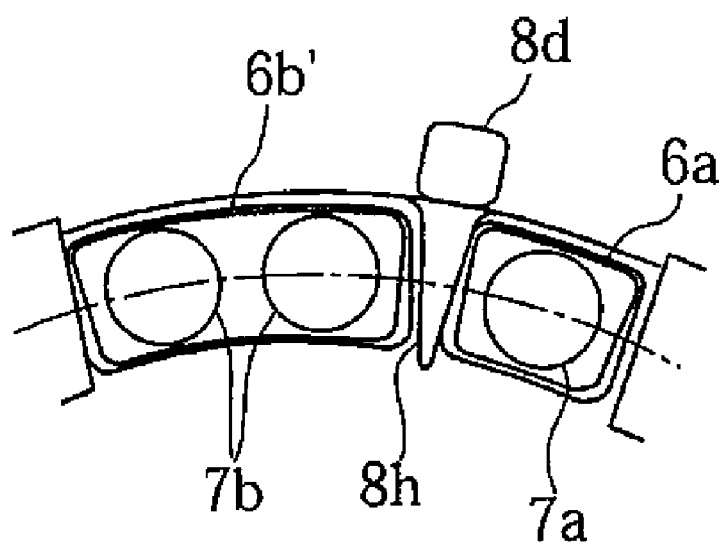
FIG. 8 is a view showing a construction of pad units according to a modification of the embodiment.

Also, while the friction members have been described as being the same in number and in shape as the pistons, as shown in FIG. 8, the invention may instead comprise a first pad unit portion 6a having a total friction member area corresponding to a cylinder area of a first piston portion 7a and a second pad unit 6b' having a total friction member area corresponding to a total cylinder area of a second piston portion 7b, to produce substantially the same effect as in the embodiments described above.

Figure 9:
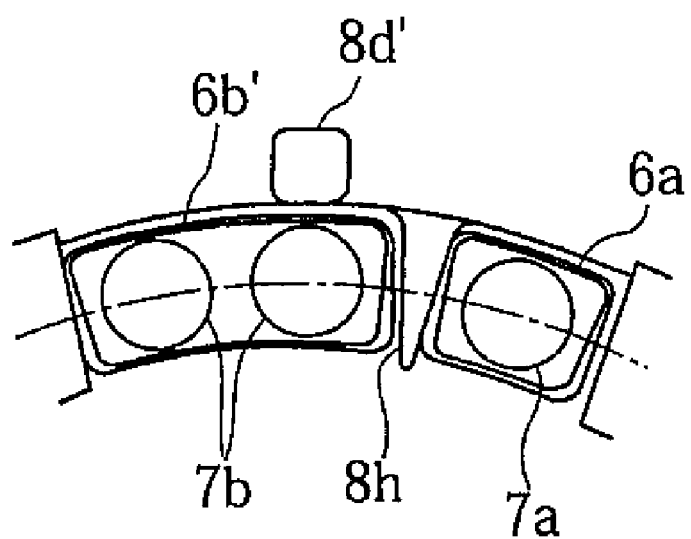
FIG. 9 is a view showing a construction of a bridge according to a modification of the embodiment.

Further, while bridge 8d of the caliper body 8 has been described as arranged between the first and second piston portions 7a, 7b, as shown in FIG. 9, a bridge 8d' may instead be arranged in the vicinity of a center of pistons 9b in second piston portions 7b, which are large in friction member area. In this case, it is possible to heighten a caliper, which supports a second pad unit 6b' having a large friction member area, in stiffness, thus suppressing brake noise due to surface vibration of pads.

While the disk braking device of the invention has been described with respect to a front wheel of a motorcycle, it could be applied to a rear wheel as well as to other vehicles such as small-sized three-wheelers, four-wheelers, ATV (all-terrain vehicles), and so on.

The particular embodiments of the invention described in this document should be considered illustrative, rather than restrictive. Modification to the described embodiments may be made without departing from the spirit of the invention as defined by the following claims.

The invention claimed is:

1. A disk braking device comprising:
    a disk plate fixed to a wheel;
    a pad unit arranged to generate a frictional force between the pad unit and the disk plate, the pad unit including at least a first pad unit portion and a second pad unit portion;
    a piston mechanism arranged to move the pad unit into pressure contact with the disk plate, the piston mechanism including at least a first piston portion including at least one piston and a second piston portion including at least one piston, and all of the pistons have a same cylinder area; and
    a caliper body arranged to hold the piston mechanism; wherein
    each of the first and second pad unit portions includes:
        a single base plate, the at least one piston of the first piston portion arranged to abut the single base plate of the first pad unit portion and the at least one piston of the second piston portion arranged to abut the single base plate of the second pad unit portion; and
        at least one friction member attached to the single base plate and arranged to abut against the disk plate, and all of the friction members have a same friction member area;
    the first pad unit portion has a total friction member area corresponding to a total cylinder area of the first piston portion, and the second pad unit portion has a total friction member area corresponding to a total cylinder area of the second piston portion;
    the first piston portion includes fewer pistons than the second piston portion such that the total cylinder area of the first piston portion is less than the total cylinder area of the second piston portion, and the total friction member area of the first pad unit portion is less than the total friction member area of the second pad unit portion; and
    the single base plate of the first pad unit portion is not connected to the single base plate of the second pad unit portion such that the single base plate of the first pad unit portion acts independently of the single base plate of the second pad unit portion.

2. The disk braking device according to claim 1, wherein all of the friction members are the same in shape.

3. The disk braking device according to claim 2, wherein the friction members are arranged radially about a point that is spaced from a center of the disk plate.

4. The disk braking device according to claim 1, wherein the first piston portion is arranged on an entering, upstream side of the disk plate.

5. The disk braking device according to claim 1, further comprising a torque bearer arranged to hinder movements of the first and second pad unit portions, the torque bearer arranged between the first and second pad unit portions to bear torque exerted by the first pad unit portion.

6. The disk braking device according to claim 1, wherein the caliper body comprises:

piston holding portions arranged in opposition to each other with the disk plate therebetween; and a bridge arranged to join the piston holding portions together to straddle the disk plate and that is offset toward one of the first and second pad unit portions.

7. The disk braking device according to claim 6, wherein the bridge is offset toward the first pad unit portion.

8. The disk braking device according to claim 6, wherein the bridge is offset toward the second pad unit portion.

9. The disk braking device according to claim 6, wherein the bridge is integral with a torque bearer arranged to hinder movements of the first and second pad unit portions.

10. The disk braking device according to claim 6, wherein the second piston portion includes at least two pistons, and an interval between the at least two pistons is smaller than an interval between the at least one piston in the first piston portion and a piston of the at least two pistons in the second piston portion adjacent to the first piston portion.

11. The disk braking device according to claim 1, wherein the caliper body comprises a pair of piston holding portions arranged in opposition with the disk plate therebetween, wherein one of the piston holding portions is provided with a work hole for forming a piston holding hole, and the other of the piston holding portions is provided with a mount hole arranged to mount the caliper body on a vehicle side of the disk braking device.

12. A motorcycle comprising:
the disk braking device according to claim 1.

* * * * *